United States Patent
Yarbrough et al.

(10) Patent No.: US 10,422,315 B2
(45) Date of Patent: Sep. 24, 2019

(54) PULTRUDED COMPONENTS FOR A SHEAR WEB OF A WIND TURBINE ROTOR BLADE

(71) Applicant: General Electric Company, Schenectady, NY (US)

(72) Inventors: Aaron A. Yarbrough, Greenville, SC (US); Christopher Daniel Caruso, Greenville, SC (US)

(73) Assignee: General Electric Company, Schenectady, NY (US)

(*) Notice: Subject to any disclaimer, the term of this patent is extended or adjusted under 35 U.S.C. 154(b) by 1037 days.

(21) Appl. No.: 14/841,879

(22) Filed: Sep. 1, 2015

(65) Prior Publication Data
US 2017/0058867 A1    Mar. 2, 2017

(51) Int. Cl.
F03D 1/06 (2006.01)

(52) U.S. Cl.
CPC ........ *F03D 1/0675* (2013.01); *F05D 2230/60* (2013.01); *Y02E 10/721* (2013.01)

(58) Field of Classification Search
CPC ... F03D 1/0675; F05D 2230/60; Y02E 10/721
USPC .......................................... 416/226; 244/119
See application file for complete search history.

(56) References Cited

U.S. PATENT DOCUMENTS

| | | | |
|---|---|---|---|
| 5,476,704 A * | 12/1995 | Kohler | B29C 66/721 244/119 |
| 6,264,877 B1 | 7/2001 | Pallu De La Barriere | |
| 6,986,205 B2 * | 1/2006 | Vrana | E04C 3/292 29/432 |
| 7,611,595 B2 * | 11/2009 | Barnes | B23K 35/02 156/148 |
| 7,625,185 B2 | 12/2009 | Wobben | |

(Continued)

FOREIGN PATENT DOCUMENTS

| CN | 101906251 | 8/2010 |
|---|---|---|
| JP | 2007-92716 | 4/2007 |

(Continued)

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.

*Primary Examiner* — Mark A Laurenzi
*Assistant Examiner* — Paul W Thiede
(74) *Attorney, Agent, or Firm* — Dority & Manning, P.A.

(57) ABSTRACT

The present subject matter is directed to a rotor blade assembly for a wind turbine having a pultruded component at an interface of a shear web and a spar cap. More specifically, the rotor blade assembly includes an upper shell member having an upper spar cap configured on an internal surface thereof and a lower shell member having a lower spar cap configured on an internal surface thereof. A shear web extends between the spar caps along a longitudinal length of the blade. Further, the shear web includes a first end and a second end. The first end is secured to the upper spar cap at a first interface and the second end is secured to the lower spar cap at a second interface. In addition, the shear web includes at least one pultruded component configured at either or both of the first or second interfaces between the first and second ends and the upper and lower spar caps, respectively.

11 Claims, 11 Drawing Sheets

(56) References Cited

U.S. PATENT DOCUMENTS

| | | | |
|---|---|---|---|
| 8,235,671 B2* | 8/2012 | Yarbrough | F03D 1/065 416/226 |
| 8,262,362 B2* | 9/2012 | Yarbrough | F03D 1/0683 29/527.1 |
| 8,317,479 B2 | 11/2012 | Vronsky et al. | |
| 8,353,674 B2 | 1/2013 | Bech | |
| 8,393,871 B2* | 3/2013 | Yarbrough | F03D 1/065 416/226 |
| 8,540,491 B2 | 9/2013 | Gruhn et al. | |
| 8,657,581 B2 | 2/2014 | Pilpel et al. | |
| 8,673,106 B1 | 3/2014 | Jolley et al. | |
| 8,747,098 B1 | 6/2014 | Johnson et al. | |
| 8,961,142 B2 | 2/2015 | Wansink | |
| 8,992,813 B2 | 3/2015 | Robbins et al. | |
| 9,458,823 B2* | 10/2016 | Liu | F16B 2/10 |
| 2009/0148300 A1 | 6/2009 | Driver et al. | |
| 2011/0097211 A1 | 4/2011 | Rudling | |
| 2012/0039720 A1 | 2/2012 | Bech | |
| 2013/0164133 A1 | 6/2013 | Grove-Nielsen | |
| 2013/0216388 A1 | 8/2013 | Akhtar et al. | |
| 2013/0333823 A1 | 12/2013 | Hedges et al. | |
| 2014/0003956 A1 | 1/2014 | Lull et al. | |
| 2014/0295187 A1 | 10/2014 | Jacobsen et al. | |
| 2015/0023799 A1* | 1/2015 | Wetzel | F03D 1/0675 416/226 |
| 2015/0152838 A1* | 6/2015 | Merzhaeuser | F03D 1/0675 416/226 |
| 2015/0224759 A1 | 8/2015 | Boon | |
| 2015/0224760 A1 | 8/2015 | Eyb et al. | |
| 2017/0021517 A1* | 1/2017 | Hsu | B26D 7/01 |
| 2017/0058866 A1* | 3/2017 | Caruso | F03D 1/0675 |
| 2017/0074240 A1* | 3/2017 | Caruso | F03D 1/0675 |
| 2018/0223794 A1* | 8/2018 | Tobin | F03D 1/0675 |

FOREIGN PATENT DOCUMENTS

| | | |
|---|---|---|
| WO | WO 2010/025830 A2 | 3/2010 |
| WO | WO 2011/08835 A2 | 7/2011 |
| WO | WO 2011/098785 A2 | 8/2011 |
| WO | WO 2015/015202 A1 | 2/2015 |

\* cited by examiner

PULTRUDED COMPONENTS FOR A SHEAR WEB OF A WIND TURBINE ROTOR BLADE

FIELD OF THE INVENTION

The present invention relates generally to the field of wind turbines, and more particularly to pultruded components for a shear web of a wind turbine rotor blade that improve bonding between the shear web and the spar caps.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades are the primary elements for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to the generator for producing electricity.

The rotor blades typically consist of a suction side shell and a pressure side shell that are bonded together at bond lines along the leading and trailing edges of the blade. An internal shear web extends between the pressure and suction side shell members and is bonded to spar caps affixed to the inner faces of the shell members. Relatively exact length dimensions are required for the shear web to span between the spar caps and achieve a bond between the spar caps and shear web having sufficient width and thickness dimensions. Achieving these dimensions, as well as an adequate bond, can be difficult and the juncture between the spar caps and shear web is a time-consuming and tedious process that often requires significant re-work.

With typical blade configurations, the shear web is a continuous member that spans between the spar caps. Further, a rigid flange that is laminated together with a core material is used to achieve a desired bond width for bond paste applied between the spar caps and transverse ends of the shear web. This configuration, however, places significant stresses at the juncture between the shear web and spar cap and often results in the use of excess bond paste to achieve a desired bond width at this critical juncture. The excess paste contributes unnecessary weight to the blade and can break off, thereby resulting in blade "rattling" during operation of the wind turbine (a common complaint from wind turbine owners and/or operators). Also, air voids and unpredictable squeeze-out of the bond paste in the typical configurations can result in areas of decreased bond strength, which is particularly problematic in sections of the blade where repair is not possible from within the rotor blade.

Accordingly, the industry would benefit from an improved shear web configuration that addresses one or more of the deficiencies of certain conventional configurations.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes an upper shell member having an upper spar cap configured on an internal surface thereof and a lower shell member having a lower spar cap configured on an internal surface thereof. A shear web extends between the spar caps along a longitudinal length of the blade. Further, the shear web includes a first end and a second end. The first end is secured to the upper spar cap at a first interface and the second end is secured to the lower spar cap at a second interface. In addition, the shear web includes at least one pultruded component configured at either or both of the first or second interfaces between the first and second ends and the upper and lower spar caps, respectively.

In one embodiment, the shear web further includes a first pultruded component at the first interface and second pultruded component at the second interface. In another embodiment, the shear web also includes a bonding agent configured at the first and second interfaces between the first and second pultruded components and the upper and lower spar caps, respectively.

In further embodiments, the pultruded component(s) include at least one cavity configured to receive the first end or the second end of the shear web. In additional embodiments, the shear web may include a bonding agent configured within the at least one cavity. Thus, the bonding agent is configured to secure the first end or the second end of the shear web within the cavity of the pultruded component.

In another embodiment, the pultruded component(s) may include at least one flange extending perpendicularly from the at least one cavity in a chord-wise direction. Thus, the flange may be easily secured to at least one of the upper or lower spar caps. More specifically, in certain embodiments, the pultruded component(s) may include opposing flanges extending from opposite sides of the cavity in a substantially chord-wise direction. Thus, the opposing flanges may be easily secured to either or both of the upper or lower spar caps.

In further embodiments, at least one of the opposing flanges may have a chord-wise extending cross-sectional shape. For example, the chord-wise cross-sectional shape may include at least one of a triangle, a rectangle, a square, an arcuate shape, a pi shape, or any other suitable shape. In addition, the chord-wise cross-sectional shape(s) may be hollow. Alternatively, the chord-wise cross-sectional shape(s) may be solid.

In further embodiments, the pultruded component(s) may be constructed, at least in part, from a thermoset material or a thermoplastic material. In yet another embodiment, the shear web may include a panel constructed of a core material enclosed, at least in part, by an outer skin layer.

In another aspect, the present disclosure is directed to a method for manufacturing a shear web for a rotor blade of a wind turbine. The method includes providing a first pultruded component having a cavity formed therein. The method also includes providing at least one panel having a first end and a second end, the panel being constructed of a core material. Another step of the method includes securing the first end of the panel within the cavity of the first pultruded component. The method further includes securing the first pultruded component to a first spar cap of the rotor blade.

In one embodiment, the method may include securing the second end of the panel within a cavity of a second pultruded component and securing the second pultruded component to a second spar cap.

In another embodiment, the step of securing the shear web between the upper and lower shell members may include securing the first pultruded component to the first spar cap, and securing the second pultruded component to the second spar cap. In alternative embodiments, the step of securing the shear web between the upper and lower shell members may further include infusing the shear web with the upper and lower shell members.

In additional embodiments, the method may include forming the first and second pultruded components with one or more flanges. More specifically, the flange(s) may extend substantially perpendicularly in a chord-wise direction from the cavity of each of the first and second pultruded components.

In additional embodiments, the step of securing the first end of the panel within the cavity of the first pultruded component may include placing an outer layer of material in a shell mold, placing the first pultruded component atop the outer layer in the shell mold, placing the panel within the cavity of the first pultruded component, and wrapping the outer layer around the first pultruded component and the panel. In alternative embodiments, the step of securing the first end of the panel within the cavity of the first pultruded component may further include bonding the panel within the cavity.

In further embodiments, the step of securing the first pultruded component to the spar cap of the rotor blade may include at least one of welding, bonding, or mechanically fastening the first pultruded component to the spar cap.

In yet another aspect, the present disclosure is directed to a shear web assembly for a rotor blade of a wind turbine. The shear web assembly includes a panel having a first end and a second end. The first end is configured for attachment to an upper spar cap of the rotor blade at a first interface, whereas the second end is configured for attachment to a lower spar cap of the rotor blade at a second interface. The shear web assembly also includes at least one pultruded component having a cavity configured therein that is configured to receive the first end or the second end of the panel. In addition, the shear web assembly includes a bonding agent configured to secure the pultruded component at the first interface or the second interface. It should be understood that the shear web assembly may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Figure 1:
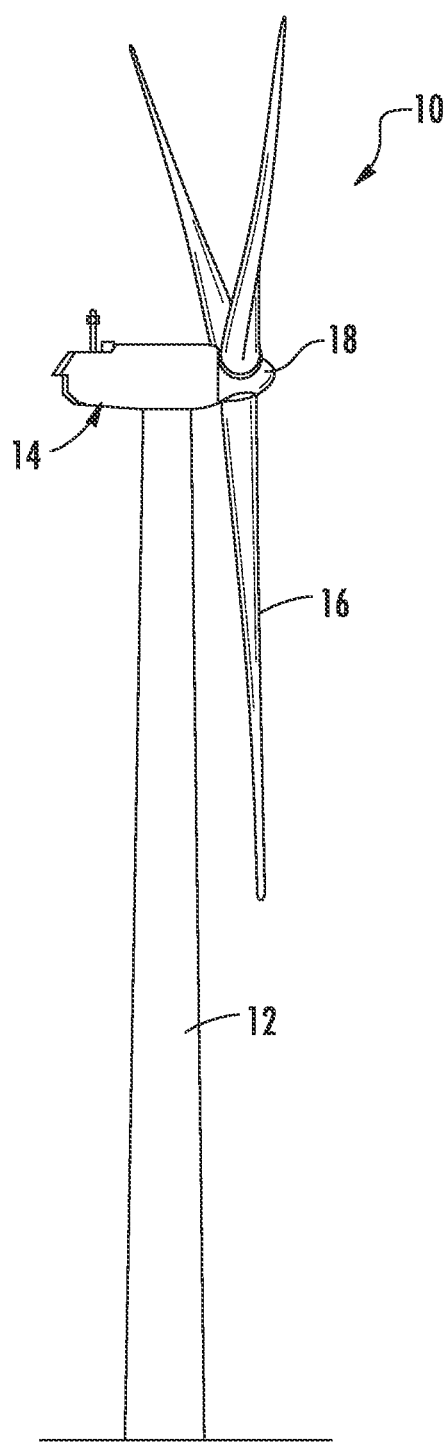
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Generally, the present disclosure is directed to a rotor blade assembly for a wind turbine having an improved shear web configuration. The rotor blade assembly includes upper and lower shell members having upper and lower spar caps configured on an internal surface thereof. The shear web extends between the upper and lower spar caps along a longitudinal length of the blade. Further, the shear web includes a first end and a second end. The first end is secured to the upper spar cap at a first interface, whereas the second end is secured to the lower spar cap at a second interface. In addition, the shear web includes at least one pultruded component configured at either or both of the first or second interfaces between the first and second ends and the upper and lower spar caps, respectively. Thus, the pultruded component(s) is configured to improve the shear web-to-shell connection (which is typically bonded).

The present subject matter provides numerous advantages not present in the prior art. For example, the manufacturing process of the present disclosure provides simplified tooling geometry for shear webs that can be used for various blade designs. In addition, the manufacturing process simplifies the shear web panel production process (which is typically infusion). Further, the pultruded component(s) reduce bond-line geometry variation at the first and second interfaces, i.e. between the shear web and the upper and lower spar caps, respectively. Moreover, the pultruded component(s) improve bond-line strength without the need for complicated infusion processes and/or layup. In addition, the shear web of the present disclosure allows for simple shear-web height adjustments. Thus, the present disclosure can improve web bonding quality and/or manufacturing time.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
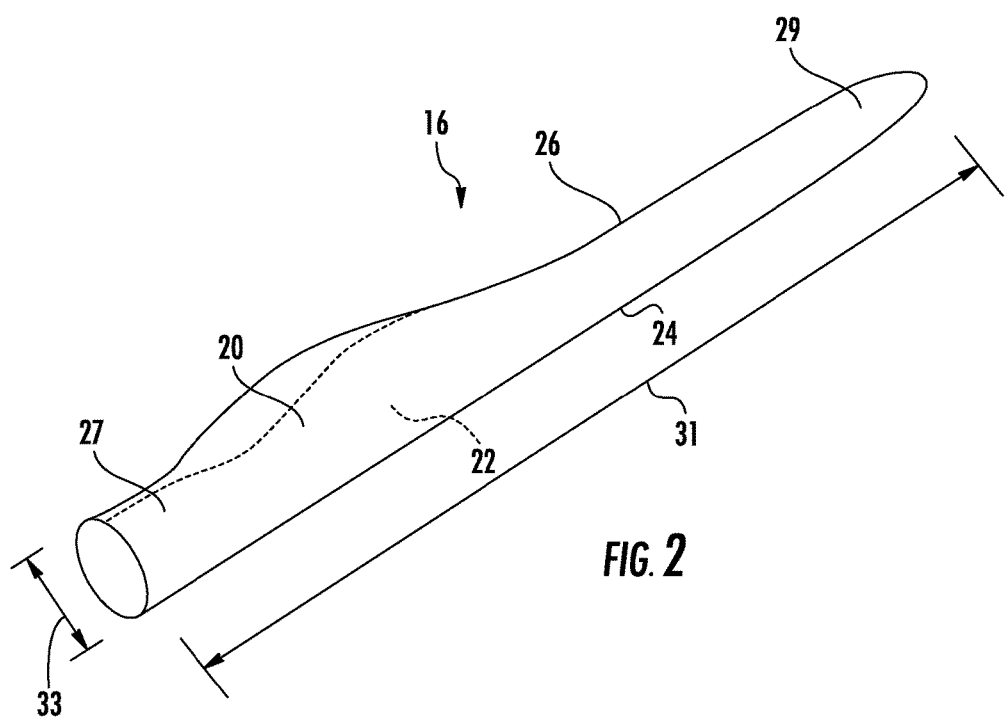
FIG. 2 illustrates a perspective view of one embodiment of a rotor blade of a wind turbine according to the present disclosure.

Referring now to FIG. 2, a more detailed view of one of the rotor blades 16 of FIG. 1 is illustrated. As shown, the rotor blade 16 includes an upper shell member 20 and a lower shell member 22. Further, the upper shell member 20 is configured as the suction side surface of the blade 16, while the lower shell member 22 is configured as the pressure side surface of the blade 16. The rotor blade 16 also includes a leading edge 24 and a trailing edge 26, as well as a root portion 27 and a tip portion 29. As is well known in the art, the upper shell member 20 and the lower shell member 22 may be joined together at the leading edge 24 and trailing edge 26 or any other suitable location. The rotor blade 16 also includes an internal cavity 25 (FIG. 3) in which various structural members, such as spar caps 32, 34 and one or more shear webs 30 according to the present disclosure, may be configured. In addition, as shown in FIG. 2, the rotor blade 16 may also have a span 31 defining the total length of the blade 16 between the root portion 27 and the tip portion 29 and a chord 33 defining the length of the blade 16 between the leading and trailing edges 24, 26.

Referring now to FIGS. 3-10, various cross-sectional views of the rotor blade 16 of FIG. 2 are illustrated that incorporate various aspects of the present invention. As shown generally in the figures, the upper shell member 20 contains an upper spar cap 32 configured on an internal surface thereof. Similarly, the lower shell member 22 contains a lower spar cap 34 configured on an internal surface thereof. The shear web 30 extends between the spar caps 32, 34 along a longitudinal length of the blade 16 in a generally span-wise direction. Further, as shown generally in the figures, the shear web 30 has a first end 36 and a second end 38. More particularly, the shear web 30 may be made of a panel 35 constructed of a core material 28 enclosed, at least in part, by an outer skin layer 40. It should be understood that the core material 28 may include any suitable core material, including but not limited to, low-density foam, cork, composites, balsa wood, composites, or similar. Suitable low-density foam materials may include, but are not limited to, polystyrene foams (e.g., expanded polystyrene foams), polyurethane foams (e.g. polyurethane closed-cell foam), other foam rubbers/resin-based foams and various other open cell and closed cell foams.

Figure 3:
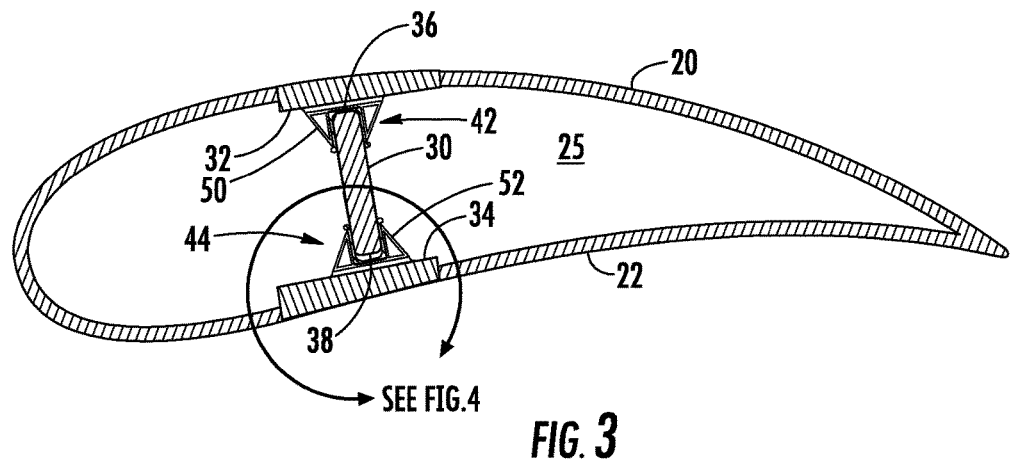
FIG. 3 illustrates a cross-sectional view of one embodiment of a rotor blade of a wind turbine according to the present disclosure, particularly illustrating a shear web having a plurality of pultruded components that secure the shear web between opposing spar caps of the rotor blade.
Figure 5:
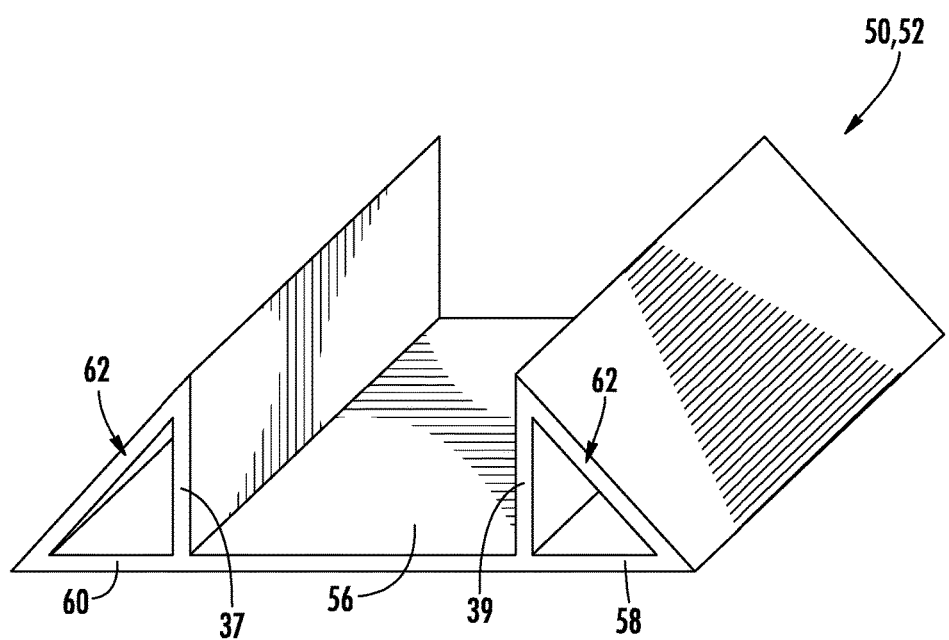
FIG. 5 illustrates a perspective view of one embodiment of a pultruded component of a shear web according to the present disclosure.
Figure 7:
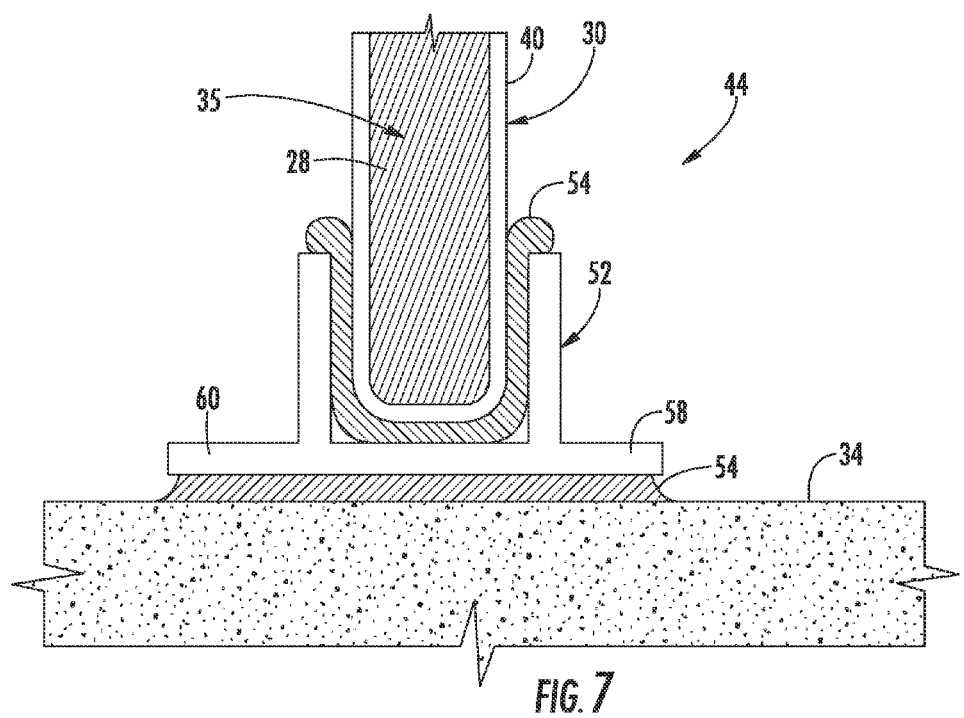
FIG. 7 illustrates a detailed view of one end of the shear web of FIG. 6.

In addition, as shown, the first end 36 may be secured to the upper spar cap 32 at a first interface 42 and the second end 36 may be secured to the lower spar cap 34 at a second interface 44. In addition, the shear web 30 may include at least one pultruded component 50 configured at either or both of the first or second interfaces 42, 44 between the first and second ends 36, 38 and the upper and lower spar caps 32, 34, respectively. More specifically, as shown in FIGS. 3, 5, and 7, the shear web 30 further includes a first pultruded component 50 at the first interface 42 and second pultruded component 52 at the second interface 44. Further, as shown, the shear web 30 may be secured to the upper and lower spar caps 32, 34 at the first and second interfaces 42, 44 via a bonding agent 54 configured between the first and second pultruded components 50, 52 and the upper and lower spar caps 32, 34, respectively. The bonding agent 54 as described herein may be any suitable agent including but not limited to bond paste, binder, tape, gum, wax, plaster, grout, resin, epoxy, sealant, glue, or similar. It should also be understood that any other suitable attachment means may be utilized to secure the shear web 30 between the spar caps 32, 34, e.g. welding.

Referring particularly to FIGS. 4, 5, 7, 9, and 10, the pultruded component(s) 50, 52 may also include at least one cavity 56 configured therein to receive either the first or second end 36, 38 of the shear web 30. In addition, the cavity 56 may include a bonding agent, e.g. such as the bonding agent 54 as described above, configured therein. Thus, the bonding agent 54 is configured to secure the first or second end 36, 38 of the shear web 30 within the cavity 56.

Figure 6:
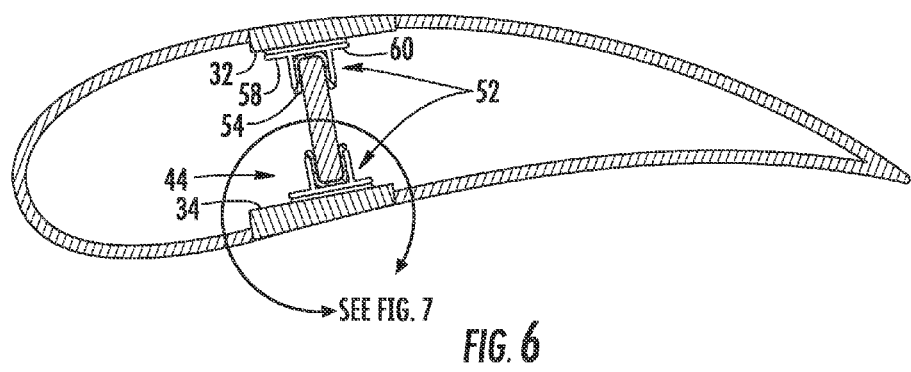
FIG. 6 illustrates a cross-sectional view of another embodiment of a rotor blade of a wind turbine according to the present disclosure, particularly illustrating a shear web having a plurality of pultruded components that secure the shear web between opposing spar caps of the rotor blade.
Figure 8:
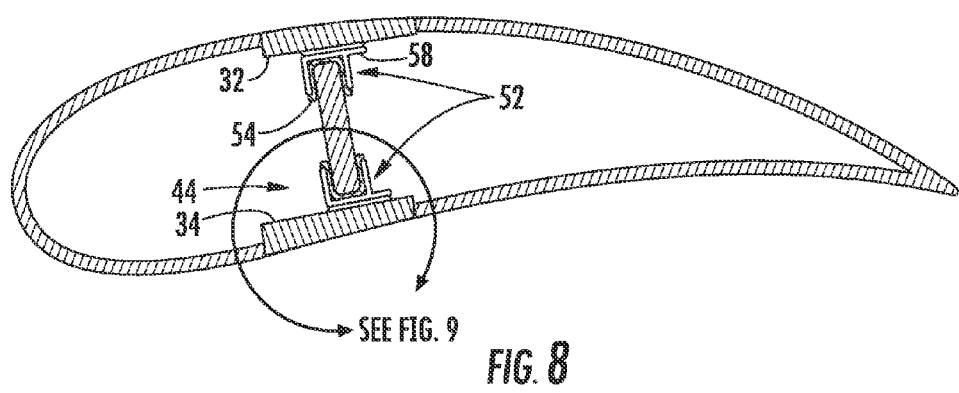
FIG. 8 illustrates a cross-sectional view of yet another embodiment of a rotor blade of a wind turbine according to the present disclosure, particularly illustrating a shear web having a plurality of pultruded components that secure the shear web between opposing spar caps of the rotor blade.
Figure 9:
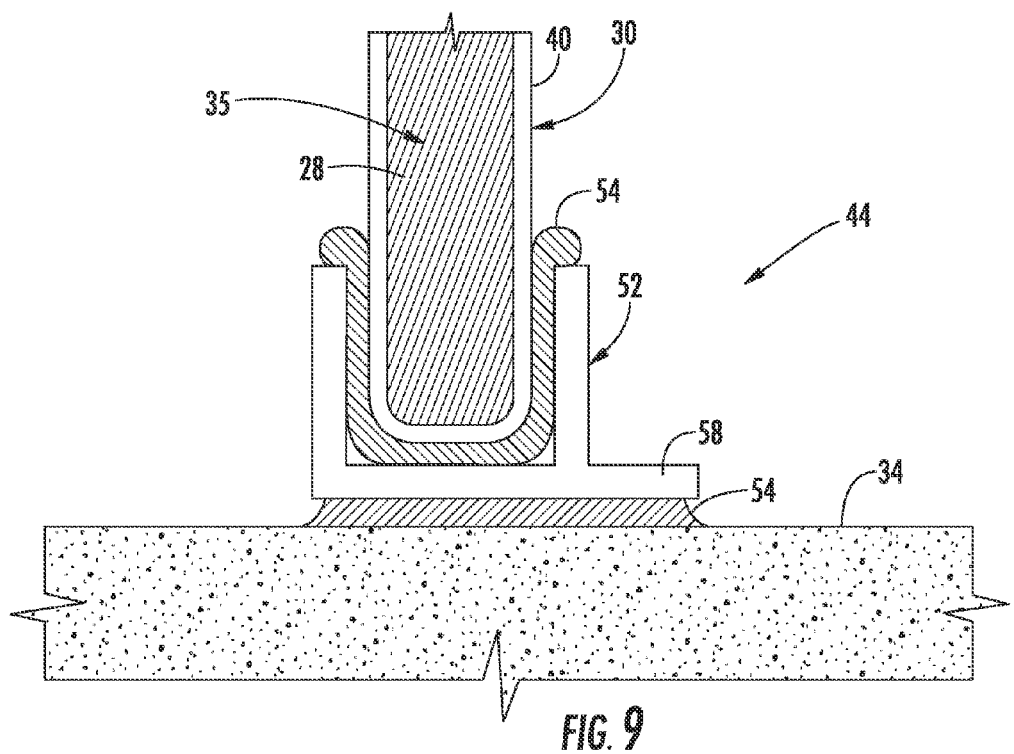
FIG. 9 illustrates a detailed view of one end of the shear web of FIG. 8.
Figure 10:
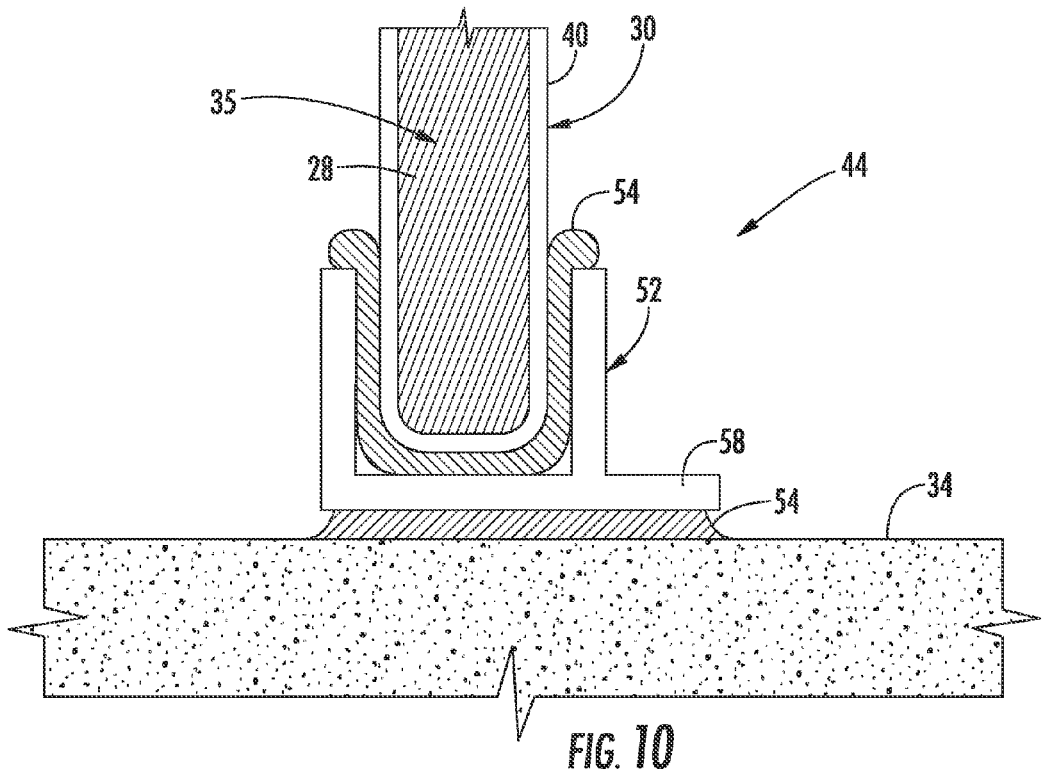
FIG. 10 illustrates detailed view of still another embodiment of an interface of the shear web according to the pressure disclosure, particularly illustrating a pultruded component configured with a first end of a panel of a shear web.

In additional embodiments, as generally illustrated in the figures, the pultruded component(s) 50, 52 may include at least one flange 58 extending perpendicularly from the at least one cavity 56 in a chord-wise direction. Thus, as shown, the flange 58 can be easily secured to either the upper or lower spar cap 32, 34. More specifically, as shown in FIGS. 8-10, the pultruded components 50, 52 may include a single flange 58 extending from either side of the cavity 56. Alternatively, as shown in FIGS. 6 and 7, the pultruded component(s) 50, 52 may include opposing flanges 58, 60 extending from opposite sides of the cavity 56 in a chord-wise direction. Thus, the opposing flanges 58, 60 can be easily secured to either of the upper or lower spar caps 32, 34, e.g. via a bonding agent, mechanical fasteners, and/or welding.

Figure 4:
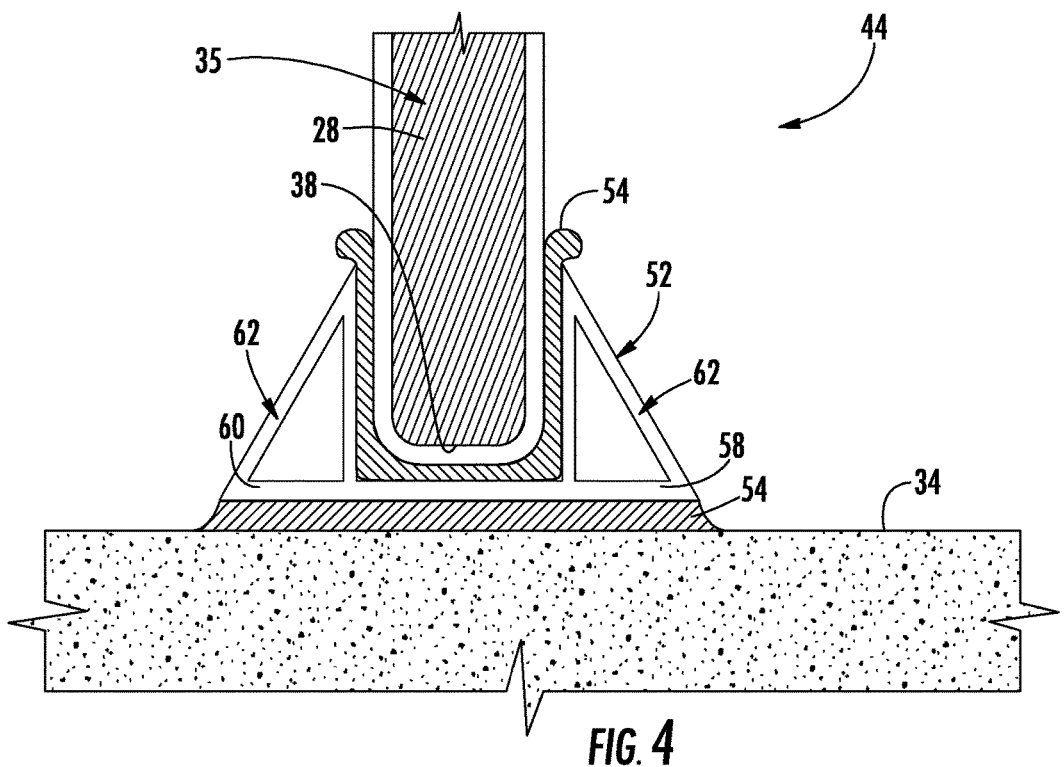
FIG. 4 illustrates a detailed view of one end of the shear web of FIG. 3.

In additional embodiments, as shown in FIGS. 4 and 5, at least one of the flanges 58, 60 may include a chord-wise cross-sectional shape 62. For example, as shown, the chord-wise cross-sectional shape 62 may include a triangle. In additional embodiments, the chord-wise cross-sectional shape 62 may include a rectangle, a square, an arcuate shape, a pi shape, or any other suitable shape. It should also be understood that any additional cross-sectional shapes may be utilized, for example, such as those shapes having a generally flat surface that can be easily bonded to one of the spar caps via a bonding agent. Further, it is advantageous for the cross-sectional shapes to have nearly perpendicular edges that receive the shear web width, e.g. within the cavity. In additional embodiments, in areas where a transition exists from one surface to another perpendicular surface, a radius in a fillet shape can be provided to form a smooth transition from one surface to the other, thereby aiding reducing any stresses at formed corners. As such, triangular-shaped flanges can be beneficial given the ability to mitigate bending stresses with little material, i.e. if the bases of the triangle are oriented on the spar cap(s) and the shear web, respectively, with the hypotenuse bridging therebetween. In addition, as shown, the chord-wise cross-sectional shape(s) 62 may be hollow. Alternatively, the chord-wise cross-sectional shape(s) 62 may be solid.

It should be understood that the pultruded component(s) 50, 52 as described herein may be constructed of any suitable material. For example, in particular embodiments, the pultruded component(s) 50, 52 may be constructed, at least in part, of a thermoset material or a thermoplastic material. Further, as used herein, the terms "pultruded component" or similar generally encompass reinforced materials (e.g. fibers or woven or braided strands) that are impregnated with a resin (e.g. a thermoset or a thermoplastic polymer) and pulled through a stationary die such that the resin cures or undergoes polymerization. As such, the process of manufacturing pultruded components is typically characterized by a continuous process of composite materials that produces composite parts having a constant cross-section. Thus, the pultruded components may be constructed of reinforced thermoset or thermoplastic materials. In addition, the pultruded components may be produced from rovings, which generally encompass long and narrow bundles of fibers that are not combined until joined by a cured resin.

The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Figure 11:
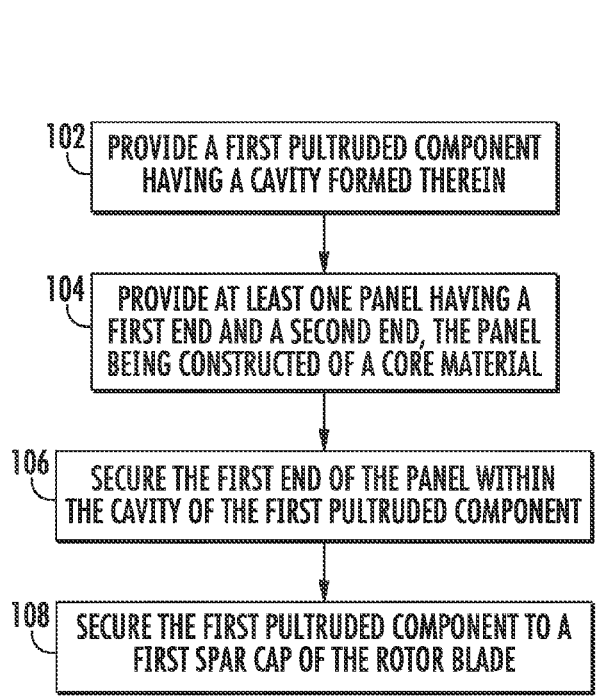
FIG. 11 illustrates a flow diagram of one embodiment of a method for manufacturing a shear web for a rotor blade of a wind turbine according to the present disclosure.
Figure 12:
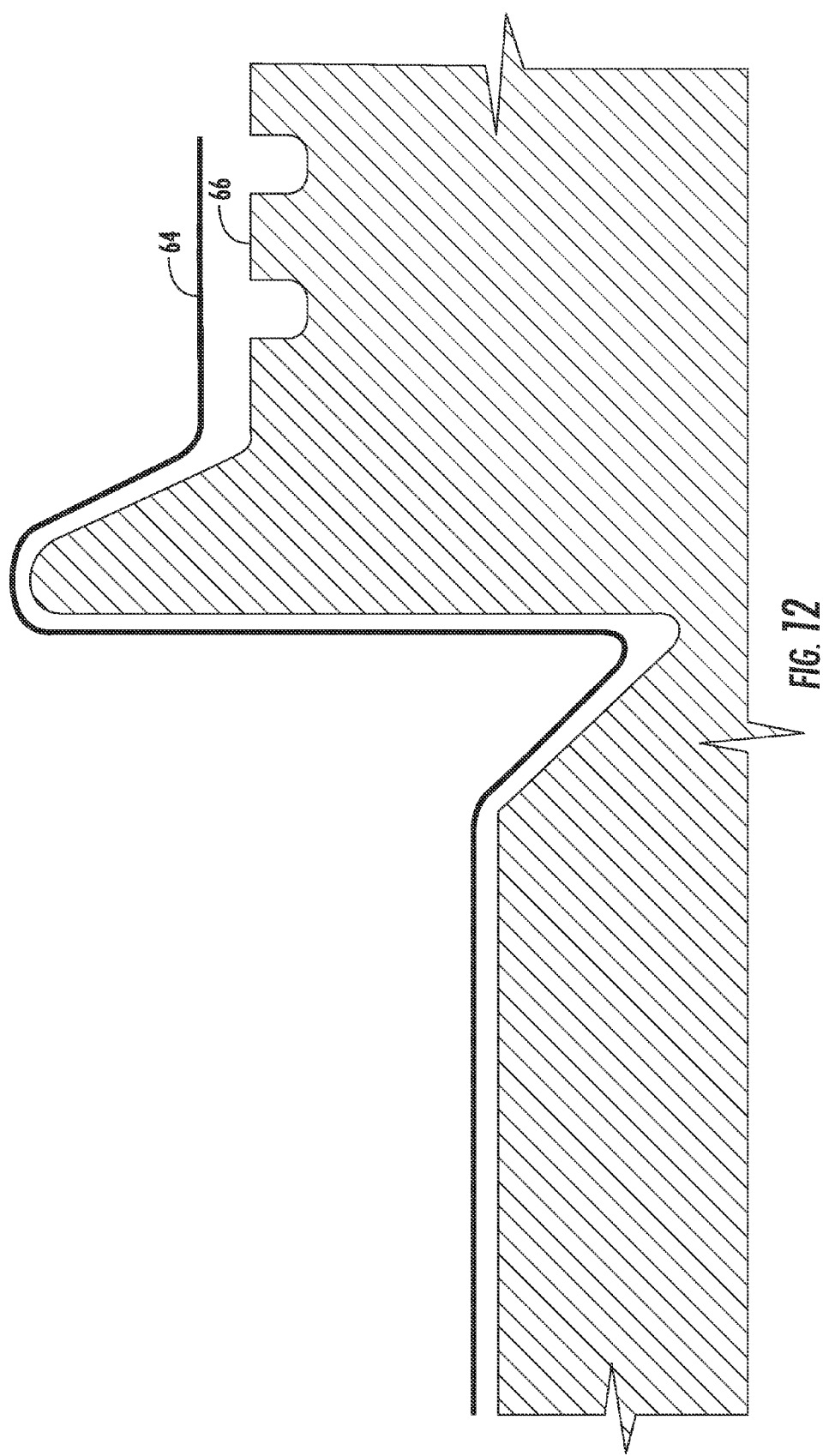
FIG. 12 illustrates a schematic diagram of one embodiment of a method step for manufacturing a shear web for a rotor blade of a wind turbine according to the present disclosure.
Figure 13:
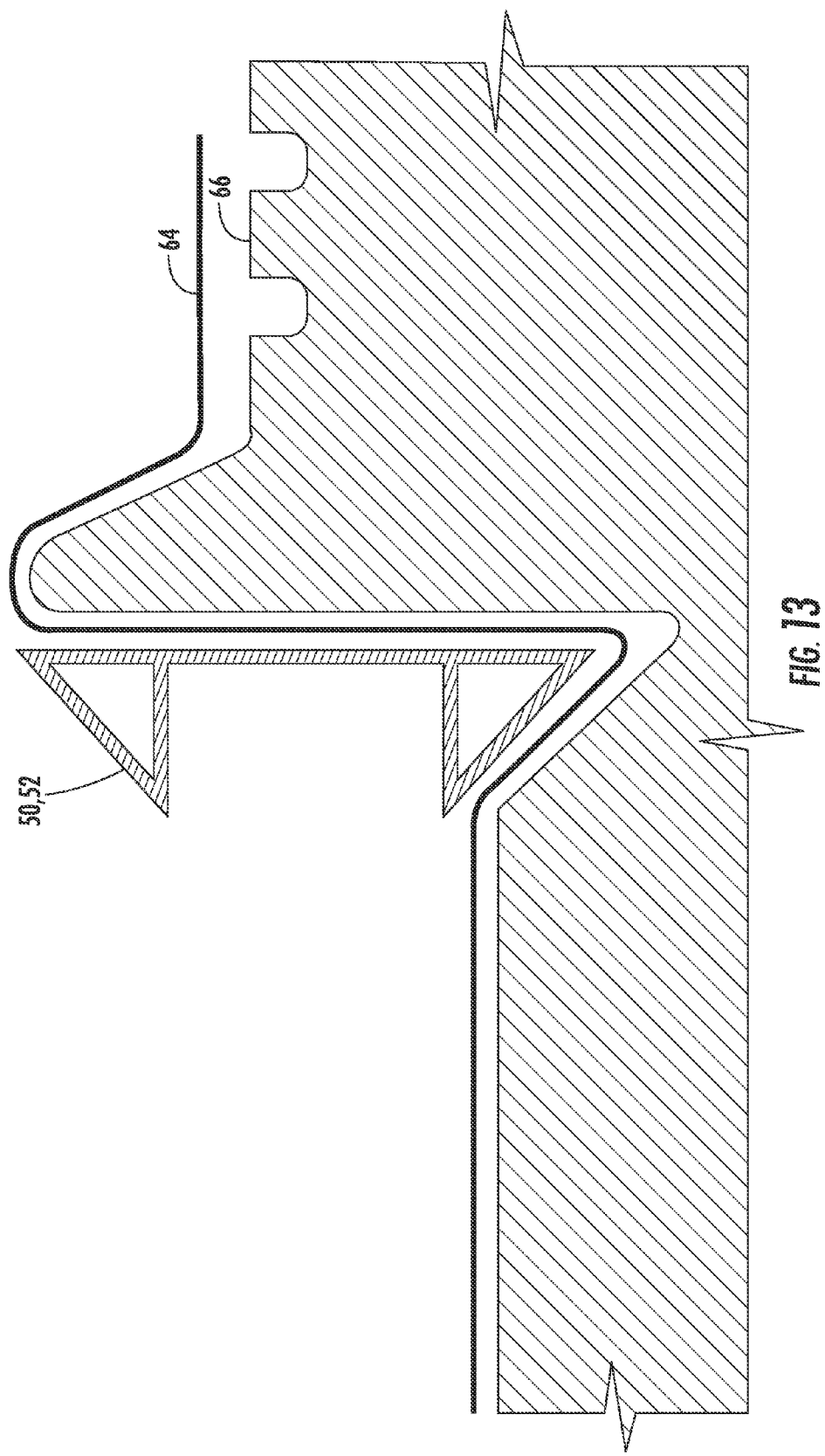
FIG. 13 illustrates a schematic diagram of one embodiment of another method step for manufacturing a shear web for a rotor blade of a wind turbine according to the present disclosure.
Figure 14:
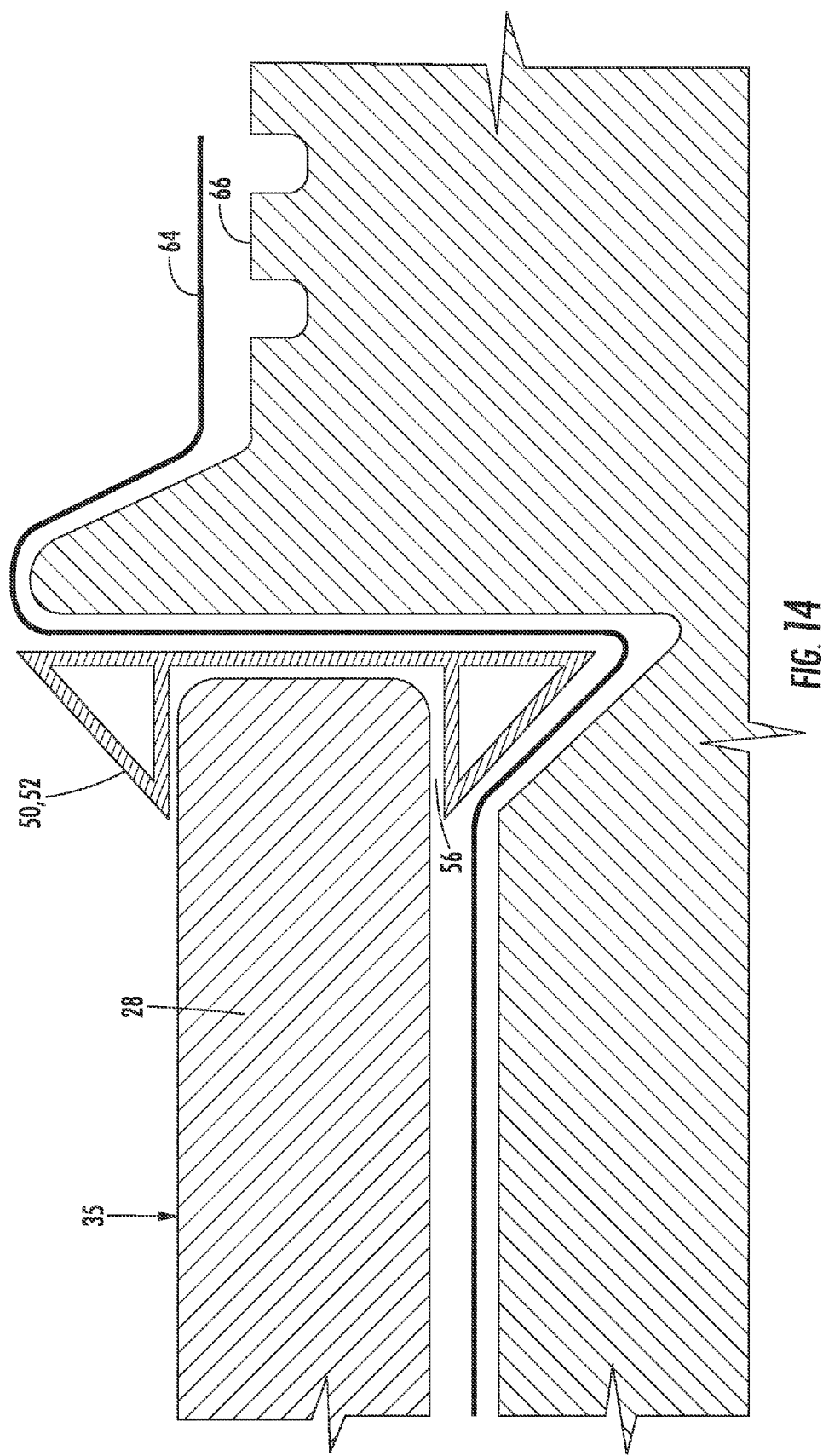
FIG. 14 illustrates a schematic diagram of one embodiment of yet another method step for manufacturing a shear web for a rotor blade of a wind turbine according to the present disclosure.

Referring now to FIGS. 11-15, various figures are illustrated to illustrate the manufacturing process for the shear web 30 according to the present disclosure. For example, as shown in FIG. 11, a flow diagram for one embodiment of a method 100 for manufacturing the shear web 30 as described herein is illustrated. As shown at 102, the method 100 includes providing a first pultruded component 50, 52 having a cavity 56 formed therein. For example, in one embodiment, the method 100 may include pultruding the component 50, 52 via any suitable pultrusion process, e.g. such as the processes as described herein. More specifically, in certain embodiments, the method 100 may include forming the pultruded component(s) 50, 52 with one or more flanges 58, 60 as generally described herein. For example, in certain embodiments, the flange(s) 58, 60 may extend substantially perpendicularly in a chord-wise direction from the cavity 56 of each of the first and second pultruded components 50, 52.

Figure 15:
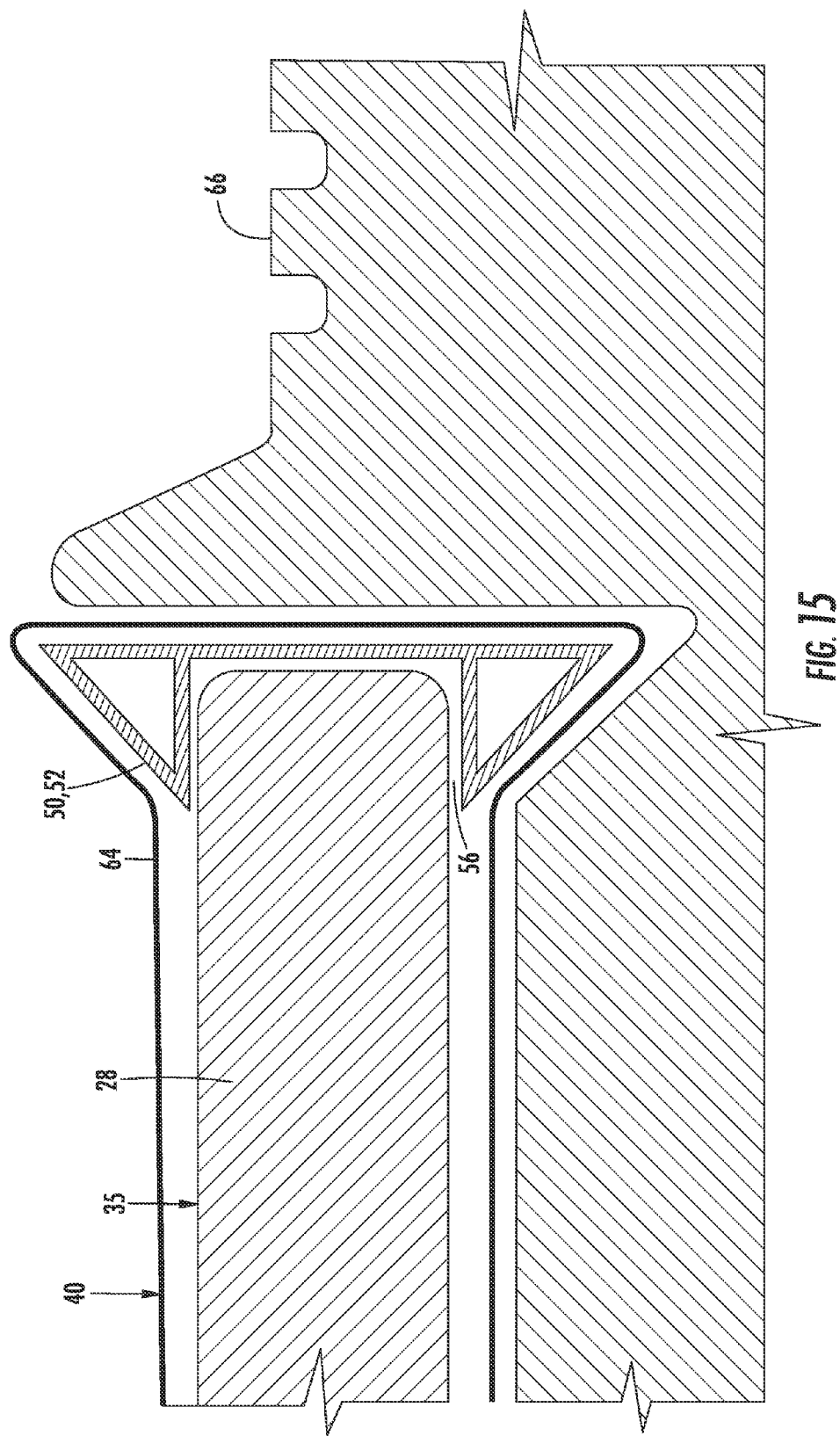
FIG. 15 illustrates a schematic diagram of one embodiment of still another method step for manufacturing a shear web for a rotor blade of a wind turbine according to the present disclosure.

As shown at 104, the method 100 also includes providing at least one panel 35 having a first end 36 and a second end 38. More specifically, the panel 35 may be constructed of a core material 28. Thus, as shown at 106, the method 100 may include securing the first end 36 of the panel 35 within the cavity 56 of the first pultruded component 50, 52. More specifically, as shown in FIGS. 12-15, the step of securing the first end 36 of the panel 35 within the cavity 56 of the pultruded component 50, 52 may include placing an outer layer 64 of material (e.g. a laminate composite material) in a shell mold 66 (FIG. 12), placing the pultruded component 50, 52 atop the outer layer 64 in the shell mold 66 (FIG. 13), placing the panel 35 of the shear web 30 within the cavity 56 of the pultruded component 50, 52 (FIG. 14), and wrapping the outer layer 64 around the pultruded component 50, 52 and the panel 35 (FIG. 15).

In alternative embodiments, the step of securing the first end 36 of the core material 28 within the cavity 56 of the pultruded component 50, 52 may include bonding the core material 28 within the cavity 56, e.g. via a bonding agent 54 as described herein.

As shown at 108, the method 100 may further include securing the first pultruded component 50, 52 to a first spar cap 32 of the rotor blade 16. It should be understood that the process can be repeated for the opposite side of the shear web 30 assembly. For example, the method 100 may also include securing the second end 38 of the panel 35 within a cavity 56 of a second pultruded component 50, 52 and securing the second pultruded component 50, 52 to a second spar cap 34. Thus, the shear web 30 can be easily secured between the upper and lower spar caps 32, 34 of the rotor blade 16. More specifically, in certain embodiments, the step of securing the pultruded component(s) 50, 52 to either the upper spar cap 32 or the lower spar 34 may include at least one of welding, bonding, or mechanically fastening the pultruded component(s) 50, 52 to the upper or lower spar caps 32, 34.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A rotor blade assembly for a wind turbine, comprising:
an upper shell member having at least one upper spar cap arranged on an internal surface thereof;
a lower shell member having at least one lower spar cap arranged on an internal surface thereof;
a shear web comprising a first end and a second end;
a first pultruded component arranged at a first end of the shear web, the first pultruded component comprising generally parallel side walls that define at least one cavity therebetween for receiving the first end of the shear web, the generally parallel side walls comprising a first end and an opposing, second end that defines a maximum height, the first pultruded component further comprising a flange extending from each of the first ends of the generally parallel side walls and a support member extending at an angle from each of the second ends of the generally parallel side walls to on of the flanges so as to form a triangular cross-sectional shape that spans the maximum height of the generally parallel side walls; and,
a bonding agent within the at least one cavity for securing the first end of the shear web within the at least one cavity, the bonding agent also placed between the opposing flanges of the first pultruded component and at least one of the upper spar cap or the lower spar cap.

2. The rotor blade assembly of claim 1, further comprising a second pultruded component arranged at the second end of the shear web.

3. The rotor blade assembly of claim 2, wherein the bonding agent is placed between the first and second pultruded components and the upper and lower spar caps, respectively.

4. The rotor blade assembly of claim 1, wherein the each of flanges defines a hollow passageway therethrough.

5. The rotor blade assembly of claim 1, wherein the first pultruded component is constructed, at least in part, from a thermoset material or a thermoplastic material.

6. The rotor blade assembly of claim 1, wherein the shear web is constructed of a core material enclosed, at least in part, by an outer skin layer.

7. A method for manufacturing a shear web for a rotor blade of a wind turbine, the method comprising:
providing a first pultruded component having generally parallel side walls each comprising a first end and an opposing, second end, the generally parallel side walls defining a first cavity therebetween for receiving a first end or a second end of the shear web, the generally parallel side walls defining a maximum height, the first pultruded component further comprising a flange extending from each of the first ends of the generally parallel side walls and a support member extending at an angle from each of the second ends of the generally parallel side walls to one of the flanges so as to form a triangular cross-sectional shape that spans the maximum height of the generally parallel side walls;
providing at least one panel having a first end and a second end, the panel being constructed of a core material;
securing the first end of the panel within the first cavity of the first pultruded component via a bonding material so as to form the shear web; and,
securing the flanges of the first pultruded component to a first spar cap of the rotor blade via a bonding agent.

8. The method of claim 7, further comprising securing the second end of the panel within a second cavity of a second pultruded component and securing the second pultruded component to a second spar cap of the rotor blade.

9. The method of claim 7, wherein securing the first end of the panel within the cavity of the first pultruded component further comprises:
placing an outer layer of material in a shell mold;
placing the first pultruded component atop the outer layer in the shell mold;
placing the panel within the cavity of the first pultruded component, and
wrapping the outer layer around the first pultruded component and the panel.

10. The method of claim 7, wherein securing the opposing flanges of the first pultruded component to the first spar cap of the rotor blade further comprises at least one of welding, bonding, or mechanically fastening the at least one pultruded component to the first spar cap.

11. A shear web assembly for a rotor blade of a wind turbine, the shear web assembly comprising:
a panel having a first end and a second end, the first end configured for attachment to an upper spar cap of the rotor blade at a first interface, the second end configured for attachment to a lower spar cap of the rotor blade at a second interface;
at least one pultruded component comprising generally parallel side walls that define a cavity therebetween for receiving the first end or the second end of the shear web, the generally parallel side walls comprising a first end and an opposing, second end that defines a maximum height, the at least one pultruded component further comprising a flange extending from each of the first ends of the generally parallel side walls and a support member extending at an angle from each of the second ends of the generally parallel side walls to one of the flanges so as to form a triangular cross-sectional shape that spans the maximum height of the side walls, the cavity sized to receive the first end or the second end of the panel;
a bonding agent for securing the opposing flanges of the at least one pultruded component at the first interface or the second interface.

* * * * *